United States Patent
Base et al.

(10) Patent No.: US 11,118,810 B2
(45) Date of Patent: Sep. 14, 2021

(54) HEAT TRANSFER ASSEMBLY

(71) Applicants: Howard J. Base, Macedonia, OH (US);
Joel Rozga, Leroy Township, OH (US);
Michael Frase, Madison, OH (US)

(72) Inventors: Howard J. Base, Macedonia, OH (US);
Joel Rozga, Leroy Township, OH (US);
Michael Frase, Madison, OH (US)

(73) Assignee: TOM RICHARDS, INC., Mentor, OH (US)

( * ) Notice: Subject to any disclaimer, the term of this patent is extended or adjusted under 35 U.S.C. 154(b) by 275 days.

(21) Appl. No.: 16/161,842

(22) Filed: Oct. 16, 2018

(65) Prior Publication Data

US 2019/0120523 A1    Apr. 25, 2019

Related U.S. Application Data

(60) Provisional application No. 62/574,562, filed on Oct. 19, 2017.

(51) Int. Cl.
| | |
|---|---|
| *H05B 3/42* | (2006.01) |
| *H05B 3/52* | (2006.01) |
| *F24H 1/12* | (2006.01) |
| *F16L 25/01* | (2006.01) |
| *H05B 3/50* | (2006.01) |
| *H05B 3/44* | (2006.01) |
| *F16L 53/38* | (2018.01) |

(52) U.S. Cl.
CPC .............. *F24H 1/121* (2013.01); *F16L 25/01* (2013.01); *F16L 53/38* (2018.01); *H05B 3/42* (2013.01); *H05B 3/44* (2013.01); *H05B 3/50* (2013.01); *H05B 3/52* (2013.01); *H05B 2203/02* (2013.01)

(58) Field of Classification Search
None
See application file for complete search history.

(56) References Cited

U.S. PATENT DOCUMENTS

| | | | | |
|---|---|---|---|---|
| 4,689,878 | A * | 9/1987 | Beauregard .............. | H05B 3/14 219/505 |
| 4,972,067 | A * | 11/1990 | Lokar ...................... | H05B 3/14 219/505 |
| 5,598,502 | A | 1/1997 | Takahashi et al. | |
| 5,845,384 | A | 12/1998 | Retzbach | |

(Continued)

FOREIGN PATENT DOCUMENTS

| | | |
|---|---|---|
| DE | 32 01 367 A1 | 7/1983 |
| DE | 100 53 656 A1 | 2/2002 |

(Continued)

OTHER PUBLICATIONS

DE 10 2011 017 108 A1, Borgwarner Beru Systems GmbH, Oct. 2012, partial translation.*

(Continued)

*Primary Examiner* — Joseph M. Pelham
(74) *Attorney, Agent, or Firm* — Fay Sharpe LLP (57) ABSTRACT

A heat transfer assembly includes a sheath which in one embodiment is elliptical in cross-section and in another embodiment has a complex cross-section with flat wall sections and curved wall sections. The sheath is elastically deformable so as to accept a heat transfer element sub-assembly. Once installed, the sheath holds the sub-assembly in place by an interference fit.

7 Claims, 8 Drawing Sheets

(56) References Cited

U.S. PATENT DOCUMENTS

| | | |
|---|---|---|
| 6,180,930 B1 | 1/2001 | Wu |
| 6,418,277 B1 | 7/2002 | Golan |
| 6,455,822 B1 | 9/2002 | Chang |
| 6,847,017 B2 | 1/2005 | Starck et al. |
| 7,034,259 B1* | 4/2006 | Lokar .................... H05B 3/44 219/538 |
| 7,332,693 B2 | 2/2008 | Hamburger |
| 8,084,721 B2 | 12/2011 | Mori et al. |
| 8,131,139 B1 | 3/2012 | Gupta |
| 8,466,392 B2 | 6/2013 | O'Connor |
| 8,481,899 B2 | 7/2013 | Jun et al. |
| 8,541,722 B2 | 9/2013 | Lauth et al. |
| 8,872,075 B2 | 10/2014 | Oh et al. |
| 8,895,898 B2 | 11/2014 | Lim et al. |
| 9,562,703 B2 | 2/2017 | Base et al. |
| 9,661,688 B2 | 5/2017 | Dent et al. |
| 9,661,689 B2 | 5/2017 | Dent et al. |
| 2004/0104215 A1* | 6/2004 | Starck .................... H05B 3/42 219/534 |
| 2006/0289464 A1 | 12/2006 | von der Luhe et al. |
| 2010/0200569 A1* | 8/2010 | Base .................... H05B 3/50 219/550 |
| 2012/0217233 A1* | 8/2012 | Base .................... H05B 3/44 219/534 |
| 2014/0038118 A1* | 2/2014 | Base .................... F28F 19/04 432/227 |
| 2014/0124499 A1 | 5/2014 | Wei et al. |
| 2014/0169776 A1 | 6/2014 | Kohl et al. |
| 2014/0299293 A1 | 10/2014 | Dent et al. |
| 2020/0103182 A1* | 4/2020 | Hokada ................ B21D 39/06 |
| 2020/0306815 A1* | 10/2020 | Tsuji .................... B21D 39/20 |
| 2020/0318855 A1* | 10/2020 | Choi .................... F28F 1/40 |

FOREIGN PATENT DOCUMENTS

| | | |
|---|---|---|
| DE | 10 2011 017 108 A1 | 10/2012 |
| DE | 102 58 257 B4 | 12/2016 |
| EP | 1 326 481 81 | 1/2005 |
| EP | 1 523 224 B1 | 2/2006 |
| EP | 1 681 906 B1 | 4/2007 |
| EP | 2 397 788 A1 | 12/2011 |
| EP | 2 693 152 A1 | 2/2014 |
| EP | 2 659 731 B1 | 4/2014 |
| FR | 2 826 829 A1 | 1/2003 |
| WO | WO 2013/060637 A1 | 5/2013 |

OTHER PUBLICATIONS

Khan et al, "Fluid Flow Around and Heat Transfer from Elliptical Cylinders," in "Journal of Thermophysics and Heat Transfer," vol. 19, No. 2, Apr.-Jun. 2005, see esp. pp. 178, 179, 183, &184.*
International Search Report/Written Opinion of International Application No. PCT/US2018/056087 dated Feb. 12, 2019, 14 pages.
"FIREBAR® Flat Tubular Heaters", Watlow Electric Manufacturing Company Brochure @ 2002, 2010 (8 pages).

* cited by examiner

HEAT TRANSFER ASSEMBLY

CROSS-REFERENCE TO RELATED APPLICATION

This application claims priority from and benefit of the filing date of U.S. provisional application Ser. No. 62/574,562 filed Oct. 19, 2017, and the entire disclosure of said prior provisional application is hereby expressly incorporated by reference into the present specification.

BACKGROUND

The present disclosure relates generally to heat transfer assemblies. In one embodiment, the disclosure relates to a self-regulating heater assembly which comprises a positive temperature coefficient heating device. In another embodiment, the disclosure relates to a cooling assembly using Peltier devices.

Self-regulating heater assemblies are well-known in the art. A positive temperature coefficient (PTC) heating device is a semiconductor which has an electrical resistance that is temperature sensitive. The electrical resistance of the PTC device varies proportionately with temperature. PTC devices are generally available as ceramics or polymers and are well-known for their use in heaters, as well as other devices, such as temperature sensors and current limiters. Their usefulness in heaters is particularly attractive due to the fact that a self-regulating heater can be constructed. When a current is passed through a PTC device, it produces heat by virtue of the internal resistance of the PTC chip.

The resultant current is similar to that of other resistance heaters, except that at a certain predetermined temperature (the auto-stabilizing temperature), the resistance begins to increase virtually exponentially causing the power to decrease. Thus, the PTC device auto-stabilizes at a particular predetermined temperature. That auto-stabilization temperature depends on the specific composition of the PTC device. The auto-stabilizing temperature feature of the PTC device is useful because it can be established at a temperature which is below the ignition temperature of the other materials contained in the environment in which the heater is placed.

While certain PTC heater assemblies are known to the prior art, such as are disclosed in U.S. Pat. Nos. 4,972,067 and 7,034,259, the disclosures of both of which are incorporated hereinto by reference in their entireties, it has been considered desirable to develop an improved PTC heater assembly.

Also known in the art are Peltier devices. Such devices function as solid state active heat pumps which transfer heat from one side of a device to the other via the consumption of electrical energy. A Peltier device can be used as a cooler, a heater, or as a thermoelectric heat pump. The Peltier effect creates a heat flux between the junction of two different types of materials that can be used either for heating or for cooling, although in practice, the main application is cooling. Peltier devices have been known for use in the heating or cooling of ultra-high purity or corrosive fluids.

Peltier devices have also been used for cooling relatively small loads, less than 1,000 BTU. Typically, where other cooling means are not practical, such as with electrical enclosures which must remain sealed, Peltier devices are useful for removing a few hundred BTUs so that internal components do not overheat.

For such heat transfer environments, it has been considered desirable to develop heat transfer assemblies which are relatively easy to manufacture. More particularly, it would be desirable if the natural resilience of a sheath enclosing a heat transfer assembly can be used to hold the various elements of the heat transfer assembly in place, while at the same time controlling the pressure exerted by the sheath on the components of the heat transfer assembly.

BRIEF DESCRIPTION

In accordance with one embodiment of the present disclosure, a self-regulating heater assembly comprises at least one positive temperature coefficient (PIC) heating element or chip and a pair of spaced electrodes. Each electrode includes a first side, wherein the first sides of the pair of electrodes are spaced from one another and define between them a slot for accommodating the at least one PTC heater element.

In one embodiment, the at least one PTC heater element is oriented approximately transverse to a longitudinal axis of the pair of spaced electrodes. A pair of power leads are provided, one being connected to each of the electrodes for energizing the pair of electrodes. A layer of an electrically insulative and thermally conductive film encases the pair of electrodes and the at least one PTC heater element trapped between them to form a sub-assembly. A sheath holds the heater element sub-assembly. The sheath is adapted to be flexed so as to simplify the installation of the heater element sub-assembly within the sheath. In one embodiment, the sheath is elliptical in cross-section. In another embodiment, the sheath has a more complex shape in cross-section. Thereafter, the natural resilience of the sheath will ensure that the heater element sub-assembly stays in place and will provide a measured amount of force to retard the sub-assembly from becoming separated from the sheath.

The heater assembly described herein is designed to provide the most efficient use of materials, provide the highest rate of thermal transfer, and the simplest method of assembly for a direct immersion PTC-based heater. The immersed portion of the heater includes four basic components: (i) the PTC chips or device(s); (ii) two electrodes or electrical conductors that also act as thermal conductors; (iii) an electrical insulator; and, (iv) a sheath configured to exert pressure on the other three components to secure them in the sheath.

In accordance with another embodiment of the present disclosure, a heat transfer assembly comprises at least one Peltier device positioned between a pair of spaced electrodes. Each electrode includes a first side, wherein the first sides of the pair of electrodes are spaced apart from one another and defined between them a slot for accommodating the at least one Peltier device. A layer of an electrically insulative and thermally conductive film encases the pair of electrodes and the at least one Peltier device held between them to form a sub-assembly. A sheath holds the sub-assembly. The sheath is adapted to be flexed so as to simplify the installation of the heat transfer sub-assembly within the sheath. Thereafter, the natural resilience of the sheath will ensure that the heat transfer sub-assembly stays in place and will provide a measured amount of force to retard the sub-assembly from becoming separated from the sheath.

DETAILED DESCRIPTION

Figure 1:
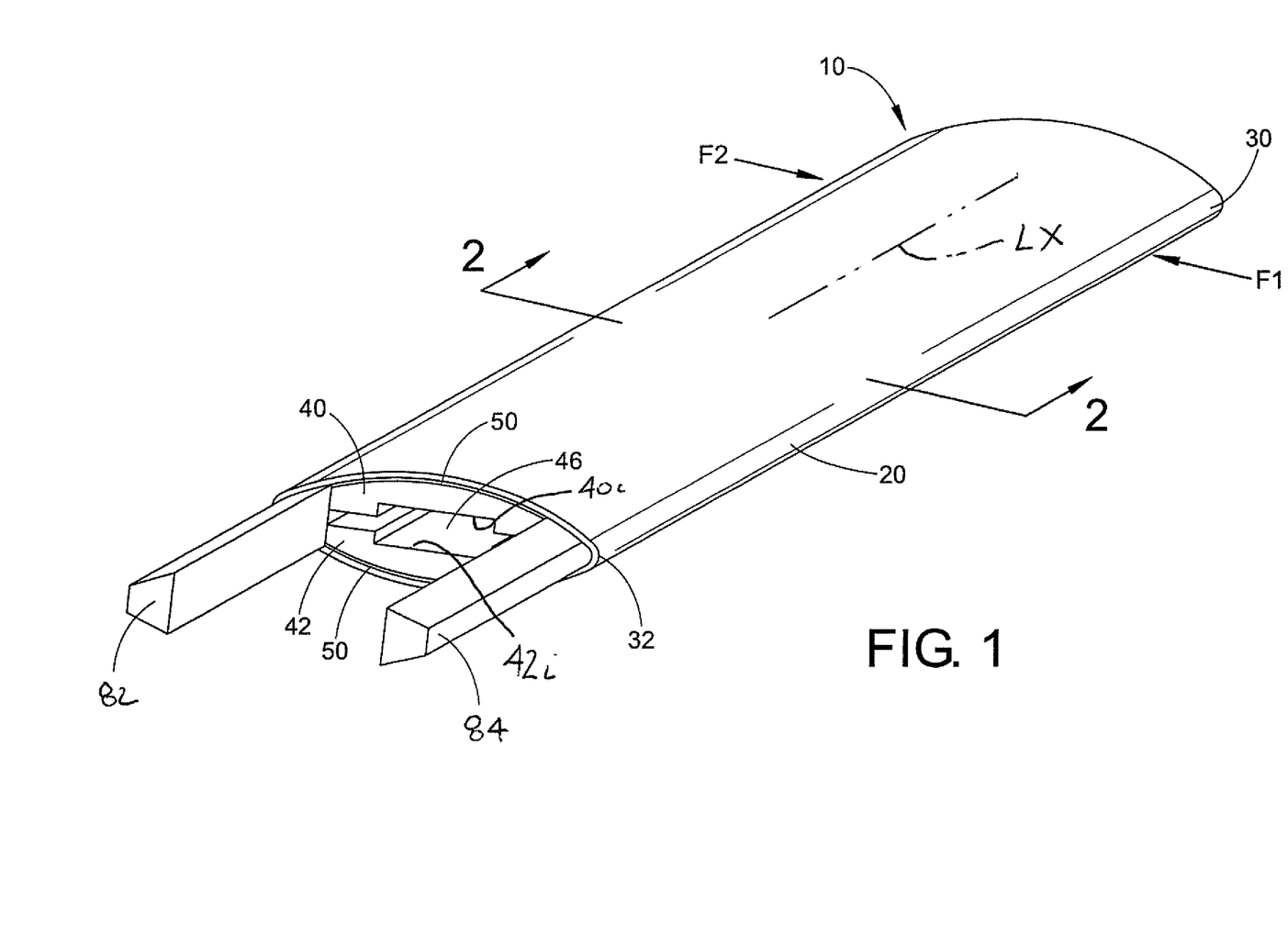
FIG. 1 is an isometric view of a PTC heater or PTC heater assembly according to a first embodiment of the present disclosure.
Figure 2:
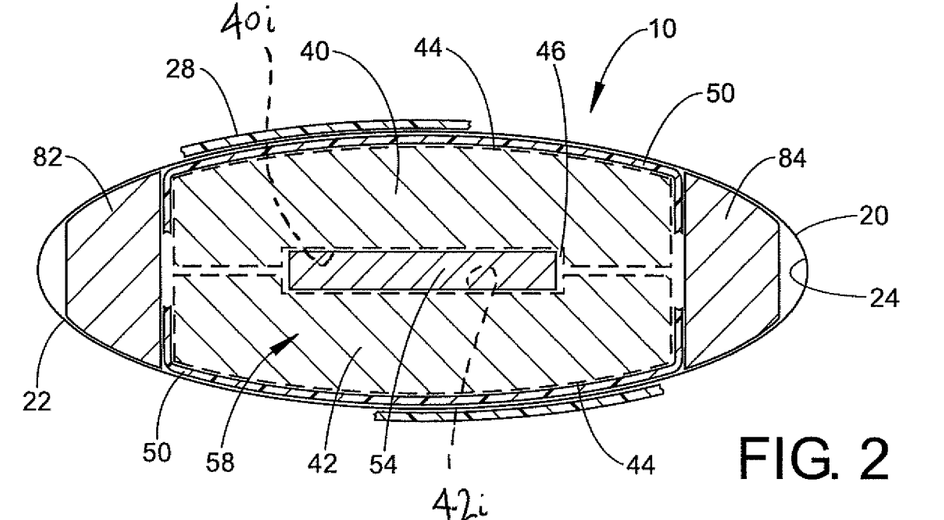
FIG. 2 is section view taken along line 2-2 of FIG. 1.

A PTC heat transfer assembly or heater assembly 10 according to an embodiment of the present development is shown in FIGS. 1 and 2. As used herein the term name "heat transfer assembly" encompasses a device that transfers heat into or out of a surrounding ambient fluid (liquid or gas) environment in which the heat transfer assembly is located. The heater assembly 10 includes a hollow tubular metallic shell, enclosure, or sheath 20 that defines an elliptical or similar ovalized or oblong cross-section. As shown herein, the sheath 20 comprises an elliptical cross-section. In the present embodiment, the sheath 20 comprises a stainless steel material, but other metals such as aluminum, titanium, or the like could be used instead depending upon the environment in which the heater 10 will be used. Perhaps even some non-metallic (e.g., polymeric or fiber reinforced polymeric) or not completely metallic materials could be used to form the sheath, just as long as such materials are resilient and are good conductors of heat. In addition, any such materials need to be relatively resistant to corrosive chemicals. If desired, the metal sheath 20 can be covered by or enclosed within a fluoropolymer sheath 28, as illustrated in FIG. 2, in order to provide superior chemical resistance and increased levels of purity to the fluid in which heat transfer is occurring. In use, at least a portion of the sheath 20 is immersed in a liquid and/or gas to transfer heat to or from the liquid and/or gas.

The sheath 20 includes and is defined by a wall 22. In this embodiment, the wall 22 can have a uniform thickness within manufacturing tolerances and can define an internal hollow space 24 (see also FIG. 4) with a geometry that matches the outside geometry defined by the wall. In one embodiment, the uniform wall thickness is in the range of 0.030 inches (0.762 mm) to 0.049 inches (1.245 mm), but other thicknesses can be used. Thus, for the elliptical sheath 20 of the present embodiment, the hollow internal space 24 is also elliptical in cross-section. A distal end 30 of the sheath or enclosure 20 can be welded shut or otherwise sealed in a liquid-tight manner, whereas a proximal end 32 thereof remains open, but can alternatively be closed, sealed or plugged.

The heater assembly 10 further includes first and second electrodes or electrical conductors 40, 42 located within the sheath 20. These can be of substantially the same length as the sheath 20. Each conductor 40, 42 includes an outer surface 44 that is shaped to conform to the inside geometry of the sheath wall 22, at least for a substantial portion of the wall 22 in the region of and on opposite sides of each co-vertex CV1, CV2 (FIG. 4) of the sheath 20 so that the conductor outer surfaces 44, considered together, lie adjacent and are abutted by a majority of the perimeter of the wall 22 inside the space (as used herein, the terms "adjacent" and "abutted" respectively include direct adjacency and direct abutment, and also respectively include indirect adjacency and indirect abutment through an intervening dielectric insulation layer 50 described in detail below). A PTC-receiving slot 46 is defined between the opposed, facing respective first or inner faces 40$i$,42$i$ of the electrodes or conductors 40, 42. The slot 46 is located coincident with or parallel to a major axis X1 (see also FIG. 4) of the elliptical sheath 20. In one embodiment, the slot 46 can be defined between the adjacent interfaces of the electrodes 40, 42 in such a manner that equal sized indentations are defined in the opposing inner faces 40$i$,42$i$ of the two electrodes 40,42. In another embodiment, the slot 46 may be completely defined in the inner face of one electrode with the other electrode having a planar inner face. Of course, other designs are also feasible. The conductors 40, 42 are adapted to be connected to respective power leads (not shown) of an associated electrical power source at the open proximal end 32 of the sheath 20.

The conductors 40, 42 are electrically insulated from the metallic sheath 20 by a dielectric film 50 or other outer covering (e.g., a Kapton®, polyimide, film available from E.I du Pont de Nemours and Company of Wilmington, Del. USA) that is electrically insulative and thermally conductive such that the heat which is conducted from the PTC chips located in the slot 46 to the electrodes 40, 42 is then further conducted through the film or covering 50 into the wall 22 of the sheath 20 for transmission to the surrounding fluid environment that is meant to be heated by the heater assembly 10.

One or a plurality of PTC heating devices or heating elements or semiconductor chips 54 (FIG. 2—sometimes referred to herein as "PTC devices 54" or "heat transfer devices 54") are positioned in the slot 46 defined between the first and second conductors 40, 42. The chips 54 can be longitudinally spaced from each other. As is generally known in the art, a PTC heating device 54 comprises a self-regulating positive temperature coefficient (PTC) thermistor semiconductor device that generates heat when energized. PTC chips are self-regulating because the resistance of the chip increases exponentially above a certain pre-set temperature. When multiple PTC heating devices 54 are located in the slot 46, these are normally axial spaced from each other along the longitudinal axis LX of the heat transfer assembly 10. If needed, Teflon spacer elements or other electrically insulative spacers (not shown) can be located between adjacent PTC heating devices or heat transfer devices 54.

If desired, interface pads, such as are disclosed in U.S. Pat. No. 7,034,259, can be employed between a face of the PTC heating device 54 and an inner face 40*i*,42*i* of the adjacent electrode 40,42. In one embodiment, such an interface pad can be constructed of a graphite film or compound which provides good electrical and heat transfer characteristics in relation to the surrounding environment from the PTC element 54 when it is energized. Such interface pads are advantageous in that they relieve tensile stresses generated by the varying expansion rates of the dissimilar materials of the several elements employed in the heater assembly 10. They also provide good lubricity to the planar surfaces of the PTC heating devices or chips 54. It should be appreciated by one skilled in the art that other known electrically and thermally conductive interface pads, films or coatings could also be used.

Figure 3:
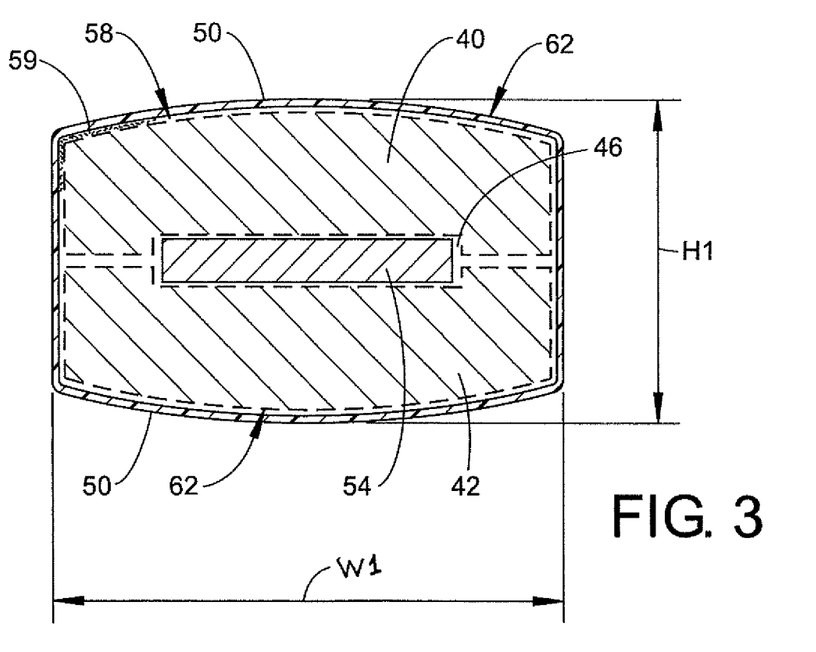
FIG. 3 is similar to FIG. 2 but an outer sheath is omitted to show only a heat transfer sub-assembly portion of FIG. 2.

The combination of the first and second conductors 40, 42, PTC devices 54, and insulation film/layer 50 provides a heat element sub-assembly or heat transfer sub-assembly 58 as shown by itself in FIG. 3.

The PTC devices or chips 54 used in the heat element or heat transfer sub-assembly 58 are preferably rectangular shaped. Chips having this shape are common, readily available devices in the market. A broad range of voltage and temperature ranges are readily available for use depending upon the desired final use of the device. It should be noted that square or round PTC devices 54 can also be used.

Kapton® (polyimide) film is an example of an advantageous material to be used as the electrical insulator 50 at least between the wall 22 of the sheath 20 (which also acts as the electrical ground) and the electrical/thermal conductors 40, 42. It should be noted that other materials could be used for the insulation film/layer such as polytetrafluoroethylene (PTFE) or perfluoroalkoxy (PFA). It has been found that Kapton® film with a silicon based adhesive layer 59 coated thereon simplifies assembly of the heat transfer sub-assembly 58. In addition, the combination of adhesive and film not only provides for relatively good heat transfer and sufficient di-electric strength, it also acts as a compliant member between an outer surface 62 of the sub-assembly 58 and the wall 22 of the sheath 20 to fill small voids and provide better thermal transfer. Finally, such a polyimide film serves as a slip plane allowing for differential thermal expansion between the heat transfer sub assembly 58 and the sheath 20. In the illustrated embodiment, the film 50 or other layer of electrically insulative and thermally conductive material completely encircles or surrounds the first and second conductors 40,42 and the semiconductor heat transfer devices 54 captured between the conductors 40,42, but the film or other layer 50 can alternatively only partially cover or surround the first and second conductors 40,42 and the semiconductor heat transfer devices 54 captured between the conductors 40,42 in which case the film/layer 50 is positioned at least between the conductors 40,42 and the wall 22 of the sheath 20 in locations where the conductors 40,42 would otherwise contact the wall 22 if the film/layer 50 was not present. Because the film or layer 50 impedes heat transfer, its thickness is preferably reduced to the extent possible while still ensuring that the film/layer 50 provides a robust heat transfer sub-assembly 58 with the required dielectric strength for the voltage applied between the first and second conductors 40,42. In one embodiment, the film or other layer 50 has a thickness of 4 mils (0.004 inches/0.1016 mm), but other thicknesses can be used.

The conductors 40, 42 are semi elliptical in shape to optimize heat transfer between the PTC device 54 and the heater sheath 20. This shape was found to be ideal due to its heat spreading capability with a minimum of material usage. Due to the relatively poor heat transfer of the material required as a heater sheath so that the sheath can resist the corrosive effects of the fluids which the disclosed PTC device 54 is designed to heat, such as stainless steels or titanium, an area greater than the PTC chip itself is required in order to maximize the output of the individual PTC chips. The semi-elliptical shape of the conductors or electrodes 40, 42 then allows the PTC chips or devices 54 to be loaded into/between the conductors and transfer heat to the sheath 20 in the most efficient manner.

When the first and second conductors 40, 42 are energized, electrical power is conducted through the PTC heating devices 54 such that they generate heat. The heat generated by the PTC heating devices or chips 54 is conducted into the electrodes or electrical conductors 40, 42 and then, via the polyimide film, into the wall 22 of the sheath 20. Heat is subsequently transferred from the sheath wall 22 to the surrounding liquid and/or gas in which the heater assembly 10 is placed so that such fluid can be heated.

In one embodiment, the elliptically shaped sheath 20 has a major diameter of 2.100" (5.334 cm) and a minor diameter of 0.740" (1.880 cm) in its uncompressed condition. The length of the sheath can be adjusted as needed to fit the dimensions of the container in which the fluid meant to be heated is held. Of course, the sheath can have other dimensions as well.

The elliptical shape of the heater sheath 20 provides several benefits over other possible shapes for an immersion heater. Most immersion heaters in the market are round. Some others are shaped as elongated flat ovals with flat or planar parallel spaced-apart sides connected by rounded or curved ends. Round heaters are common for resistance wire based heaters because they can be easily compacted to achieve better heat transfer and reduce material usage of a resistance wire for the heating element. The compacting of the insulation material, such as a magnesium oxide (MgO) ceramic material, to near its theoretical density provides the best combination of heat transfer and dielectric strength. While such compacting is feasible for resistance wire heaters, it is not desirable to so compact PTC heaters because the compaction process can damage the semiconductor PTC devices 54. The elongated flat oval heaters can be similarly compacted, and they provide somewhat more area for a given volume than would a round design. The elliptical heat transfer design disclosed herein does not need to be separately compacted, i.e., go through a compacting operation, provides more heat exchange area per unit volume than does a round sheath, and a greater, more uniform force is available to load the PTC devices 54 than would be provided by a relatively flat heater sheath. The loading force or compressive force RC (see FIG. 8) can vary between 10 and 20 PSI (68.95 and 137.9 KPa), but is typically closer to 10 PSI (68.95 KPa). The maximum loading force is believed to be well over 100 PSI (689.50 KPa). The minimum loading force is believed to be at least 2.2 PSI (15.17 KPa).

The elliptical shape of the sheath 20 provides an additional benefit for heaters using a PTC device as the heat source. It can provide the requisite compressive force RC between the electrodes 40, 42 and on the PTC chips 54, with the sheath 20 essentially acting as spring. PTC devices 54 in the power range required for an immersion heater, normally over 100 watts, require a minimum force RC (at least 2.2 PSI) to allow good thermal and electrical heat transfer. Soldering or gluing is not acceptable to achieve a useful life from the PTC device 54. The elliptical shape of the heater sheath 20 is designed to be in the range where the shape can be pressed with opposed forces DF1,DF2 (FIG. 6) on the major axis X1 of the sheath 20 effecting a change (increase)

in the minor axis X2, and a decrease of the major axis X1 (see FIG. 4), to allow for insertion of the heat element sub-assembly 58. Once the sub-assembly 58 is in place, the elastically deforming forces DF1, DF2 are removed and a resilient spring compressive force RC remains on the heater sub-assembly 58 due to the natural resiliency of the sheath 20 as it naturally seeks to return to its free (undeformed) shape, or rest state, but is prevented from fully returning to its free shape or rest state by the presence of the heat transfer sub-assembly 58 in the space 24 so that the sheath remains somewhat resiliently deformed even after the deforming forced DF1,DF2 are removed. This resilient compressive force RC of the sheath 20 remains even after repeated thermal cycles of the heater assembly 10 due to the elastic range of the material from which the elliptical heater sheath 20 is made. A round or flat shape for the sheath 20 would not provide the necessary force between the components of the heater sub-assembly 58. PTC based heater assemblies rely on some mechanism to ensure that compressive forces are maintained between all the components throughout the heating cycle.

Very careful attention must be paid to the design of the electrodes or electrical conductors 40, 42 to match the shape of the heater sheath 20; the better the shape can be matched the better the heat transfer between the electrodes 40, 42 and the wall 22 of the heater sheath 20, and therefore a more efficient heater assembly 10 can be provided. To allow for typical manufacturing tolerances, the elliptical shape of the sheath 20 is designed so that when the major axis X1 is compressed, the minor axis X2 expands beyond the tolerance of the electrodes 40, 42 and will spring back to provide the required compressive force RC over the total tolerance range of the assembly. The geometry of the outer surface 44 of each electrode 40, 42 is designed to conform with and match the shape of the elliptical wall 22 when the wall is in a state of slight compression RC. Accordingly, the heat element or heat transfer sub-assembly 58 includes an outer surface or perimeter that is at least partially elliptical to conform with the elliptical cross-section of the wall 22 and space 24 of the sheath 20

A process for constructing the PTC heater assembly 10 is disclosed with particular reference to FIGS. 3-8. As a first step shown in FIG. 3, the conductors 40, 42 and the PTC heating devices 54 are assembled as described above, with the one or more PTC heating devices 54 being located in the slot or groove 46 defined between opposing otherwise planar inner faces 40i,42i of the first and second conductors 40, 42, and the resulting layered structure (40, 54, 42) is then wrapped with the polyimide film or other electrical insulation 50, as shown in FIG. 3, to construct the heat element sub-assembly 58.

Figure 4:
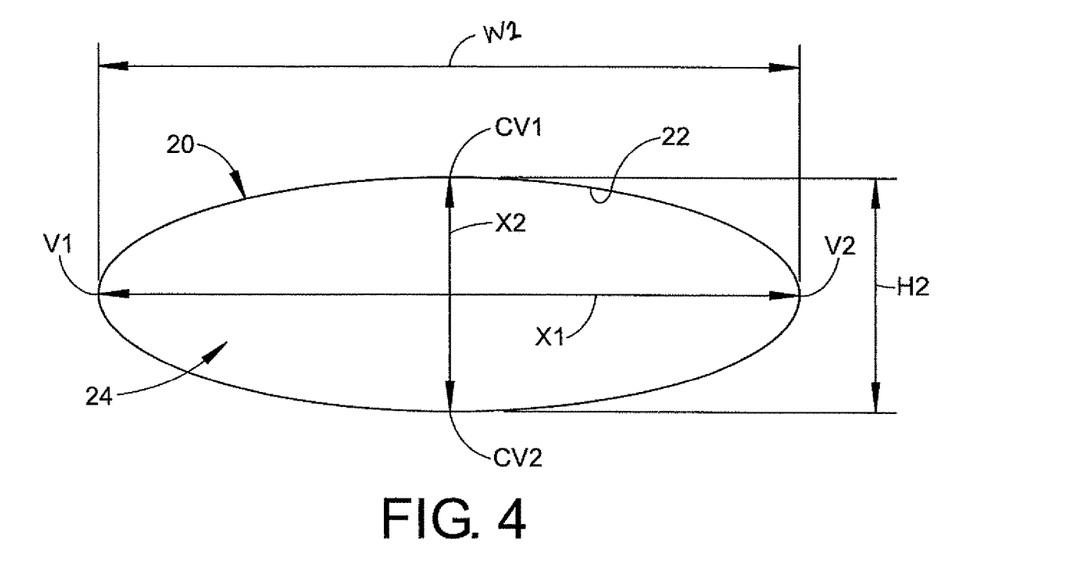
FIG. 4 is similar to FIG. 2 but the heat transfer sub-assembly is omitted to show only the outer sheath of FIG. 2.

The heat element/heat transfer sub-assembly 58 is generally elliptical in shape or otherwise shaped to conform with the inside geometry of the internal space 24 of the tubular sheath 20 to ensure substantial intimate contact between the outer surfaces 44 of the conductors 40, 42 (as covered by the dielectric film or other electrically insulative and thermally conductive layer 50) and the inner surface of the sheath wall 22 as desired for heat conduction in the fully assembled heating assembly 10, except that the maximum width W1 of the heat element sub-assembly 58 measured along its major (longer) axis is shorter than the maximum inside width W2 of the sheath 10 as measured in the space 24 at the major axis X1 (FIG. 4), and the heat element sub-assembly 58 defines a maximum height H1 that is slightly larger than the maximum inside height H2 of the sheath 20 as measured in the space 24 at the minor axis X2, wherein the width W2 and height H2 of the sheath 20 are taken when the sheath 20 is in its normal, relaxed or free (uncompressed) state as shown in FIG. 4.

Figure 5:
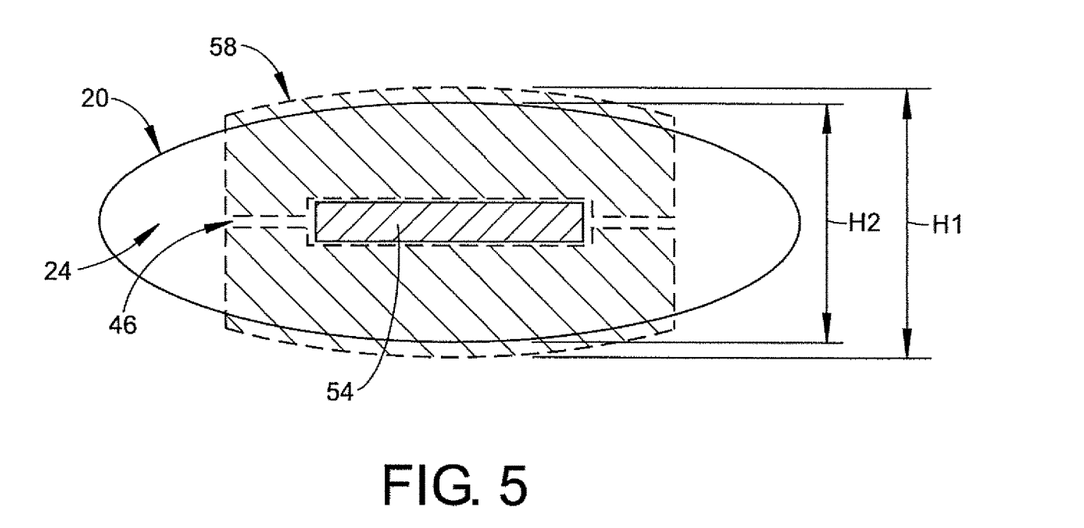
FIG. 5 provides an overlay of the heat transfer sub-assembly of FIG. 3 and the sheath of FIG. 4.

FIG. 5 shows that the heat element/heat transfer sub-assembly 58 defines a height H1 that is greater than a corresponding inside height H2 of the sheath 20 as measured at the minor axis of the sheath when the sheath is a free or relaxed state such that the heat element sub-assembly 58 is unable to be slidably received into the internal space 24 of the sheath 20 under normal conditions. For ease of comprehension, the relative dimensions are exaggerated in FIG. 5.

Referring again to FIG. 5, due to the maximum height H1 of the heat element sub-assembly 58 being greater than the maximum inside height H2 of the sheath 20 at the minor axis X2 when the sheath is in its free state, the heat element sub-assembly cannot ordinarily be inserted into the space 24 of the sheath through an open end thereof as shown. The heat element sub-assembly 58 does not fit inside the envelope defined by the space 24 of the relaxed sheath 20.

Figure 6:
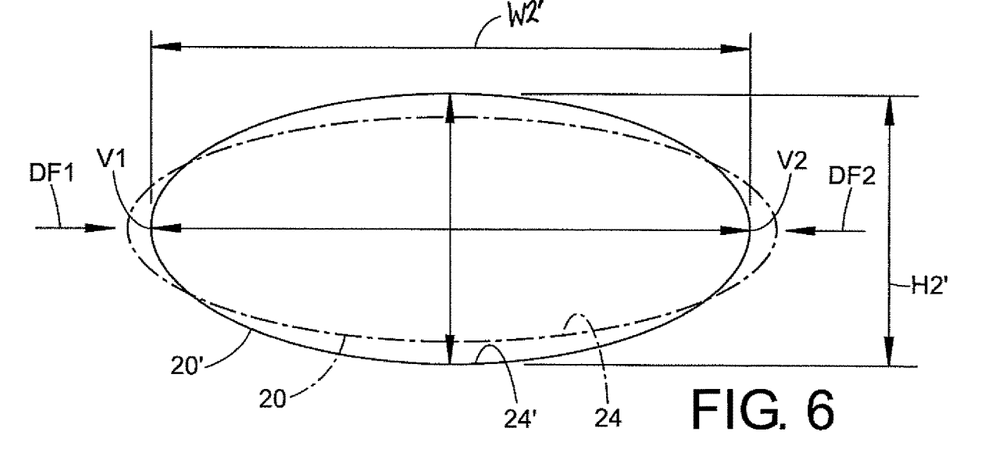
FIG. 6 shows the sheath of FIG. 4 in a resiliently deformed condition in which the sheath is compressed along its major axis and expanded along its minor axis.

With reference to FIG. 6, shown at 20' is the sheath in a resiliently deformed condition in which the sheath 20' is compressed along its major axis X1 by the opposed deformation forces DF1,DF2 (the normal or free or relaxed shape of the sheath 20 is shown with a broken line as an overlay) so that the sheath 20' temporarily defines an increased inside height H2' in the space 24 which is greater than its relaxed height H2 measured in the internal space at the minor axis of the sheath. The sheath 20 is deformed a minimum amount required to define the required increased inside height H2' in the space 24 to accommodate the heat transfer sub-assembly 58.

Figure 7:
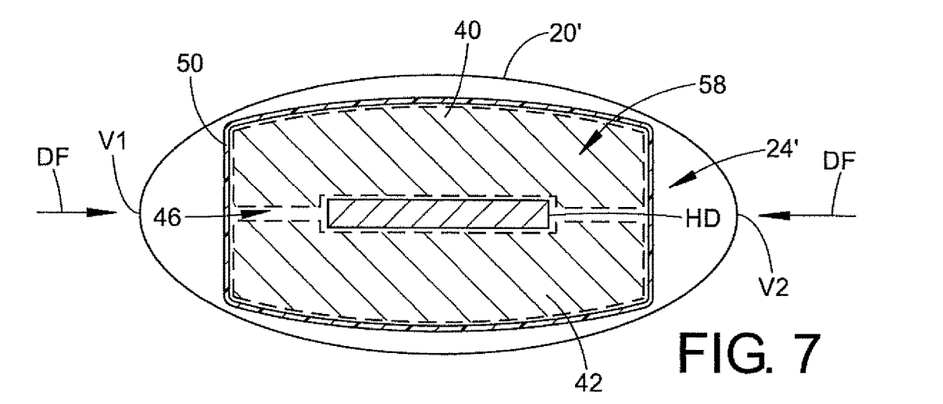
FIG. 7 shows the deformed sheath of FIG. 6 with the heat transfer sub-assembly of FIG. 2 installed therein.

As shown in FIGS. 6 and 7, to install the heat element sub-assembly 58 into the sheath 20, the sheath 20 is elastically deformed (indicated at 20') by equal and opposite inwardly directed deformation forces DF1,DF2 exerted on the sheath wall 22 at the opposed major axis vertices V1,V2, uniformly along the full axial length of the sheath 20 between its opposite ends 30, 32 such that the inside width W2 of the sheath 20 as measured in the space 24 at the major axis X1 is temporarily and resiliently shortened or reduced to a reduced inside width W2' of elastically deformed sheath 20', and the inside height H2 of the sheath 20 as measured in the space at the minor axis X2 is temporarily and resiliently lengthened or increased sufficiently to an increased inside height H2' of elastically deformed sheath 20' so that the heat element sub-assembly 58 can be slidably inserted in the temporarily elastically deformed open internal space 24' of the sheath 20' through one of its ends 30, 32 as shown in FIG. 7. The deformation forces DF1, DF2 are controlled to prevent plastic (non-elastic or irreversible) deformation of the enclosure wall 22. In one example, the sheath 20 is uniformly expanded or distended by an amount in the range of 1.5% to 5% of its original size, but this range can vary depending upon the Young's modulus (modulus of elasticity) and other properties of the material used for the sheath 20 and also upon the wall thickness of the sheath 20, and it is not intended that the present development be limited to this range.

Figure 8:
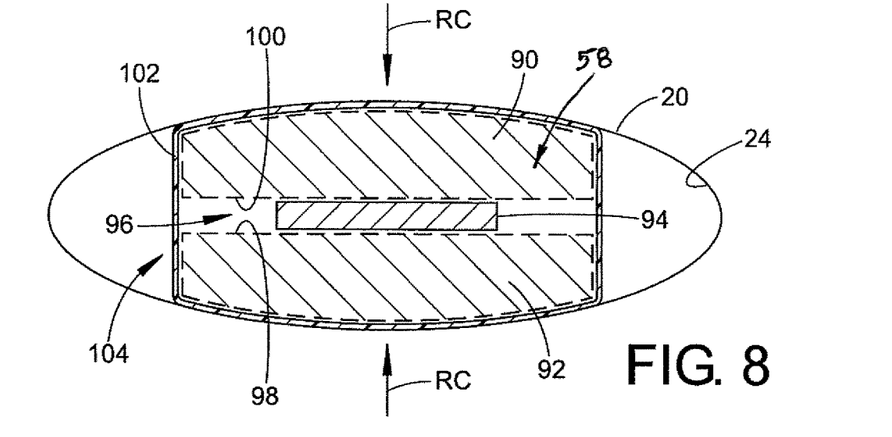
FIG. 8 is a section view of the fully assembled heater assembly that is similar to FIG. 2, but employing different electrodes and without optional filler rods being installed according to a second embodiment of the present disclosure.

As shown in the embodiment of FIG. 8, when the deformation forces DF1,DF2 are removed and the sheath 20 is allowed to relax, the sheath resiliently resumes or seeks to resume its natural, free shape and frictionally captures and clamps the heat element sub-assembly 58 inside the space 24 via resilient clamping forces RC exerted by the wall 22 of the sheath 20 on the heat element sub-assembly 58 when the temporarily increased inside height H2' of the sheath resiliently constricts relative to the heat element sub-assembly.

The clamping forces RC act transversely relative to the deformation forces and relative to the major axis X1. A majority of the perimeter of the wall 22 defining the internal space 24 is abutted with the heat transfer sub-assembly 58 when the deformation forces DF1,DF2 are removed. It should be noted that the heat transfer sub-assembly 58 can be removed by reapplication of the first and second deformation forces DF1,DF2 to once again reduce the width W2 and increase the height H2 of the sheath 20 which removes the clamping forces RC from the heat transfer sub-assembly 58 and allows the heat transfer sub assembly to be removed from the internal space 24.

With further reference to FIG. 8, this embodiment illustrates a different type of heater sub-assembly in which a pair of spaced and opposed electrodes 90 and 92 are disposed on opposite sides of a PTC chip 94, with the chip being held in a slot or gap 96 defined between opposing inner faces 98 and 100 of the respective electrodes. Unlike the embodiment illustrated in, e.g., FIG. 2, however, the electrodes 90,92 are not formed so as to cooperate and define longitudinally extending indented central sections or portions located between their inner faces in which sections the PTC chip 94 is housed. Rather, the electrodes in this embodiment have planar adjacent faces 98 and 100. The electrodes and the PTC chip are again wrapped with a film of an electrical insulator material 102 so as to form or define a heat element sub-assembly 104.

With reference to FIGS. 1 and 2, first and second metal or non-metallic filler rods or spacer rods 82, 84 can be optionally installed in the space 24 of the sheath 20 on opposed first and second sides of the heat element assembly 58, respectively, in order to fill any gap present between the opposite lateral sides/ends of the conductors 40, 42 and the wall 22 of the sheath in the region of or adjacent the first and second vertices V1, V2 located on the major axis X1. The first and second filler rods or spacers 82,84 are located in the internal space 24 respectively between the heat element assembly 58 and the first and second vertices V1,V2. In FIG. 1, the spacer rods 82, 84 are shown as being partially withdrawn from the space 24. In one embodiment, they could be longer than the sheath 20 such that they protrude outwardly from the space 24 at the open distal end 30 of the sheath.

It should be appreciated that the hot zone, the portion of the heater sheath 20 designed to transfer heat from the PTC device 10 to the surrounding fluid, in a typical immersion heater needs to be large enough to effectively and efficiently transfer heat. In one embodiment of the present disclosure, such a zone is formed by an elliptical tube 20 having a perimeter of 4.71 inches (11.96 cm). But other dimensions are contemplated and the present development is not intended to be limited to any particular dimensions.

Because the material of the sheath 20 is relatively expensive, efficient use of the material is paramount to control costs. In immersion heaters designed to be mounted on the top rim of a process tank, a cold zone or unheated section of the heater is required. The length of the cold zone can vary based upon the conditions of the application due to the standard fluid level maintained within the tank. Because of the expense of the material used for the heater sheath 20, it would therefore be advantageous to minimize the use of the primary heat conducting sheath material where it is not needed for heat transfer.

Figure 9:
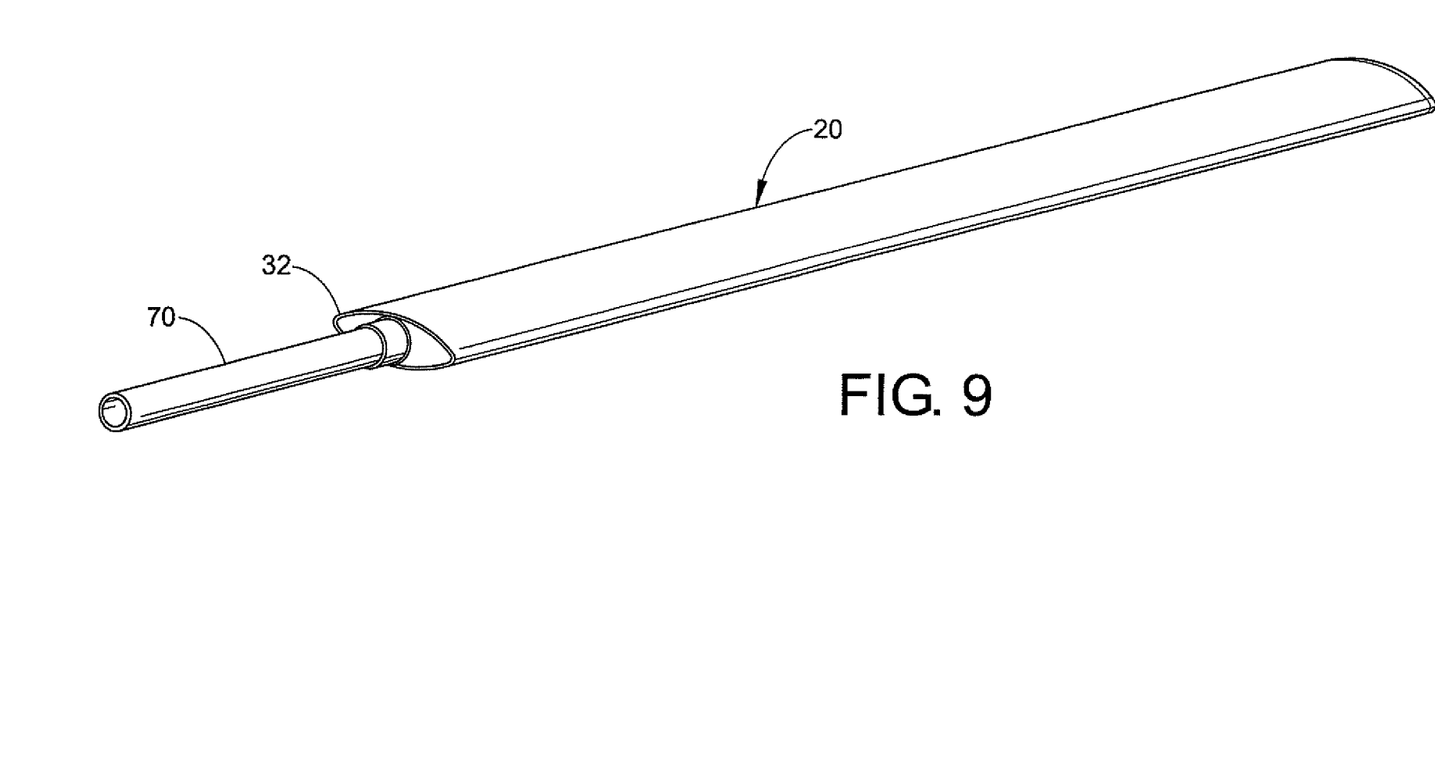
FIG. 9 is a perspective view of the sheath of FIG. 1 including a cold zone portion on one end.
Figure 10:
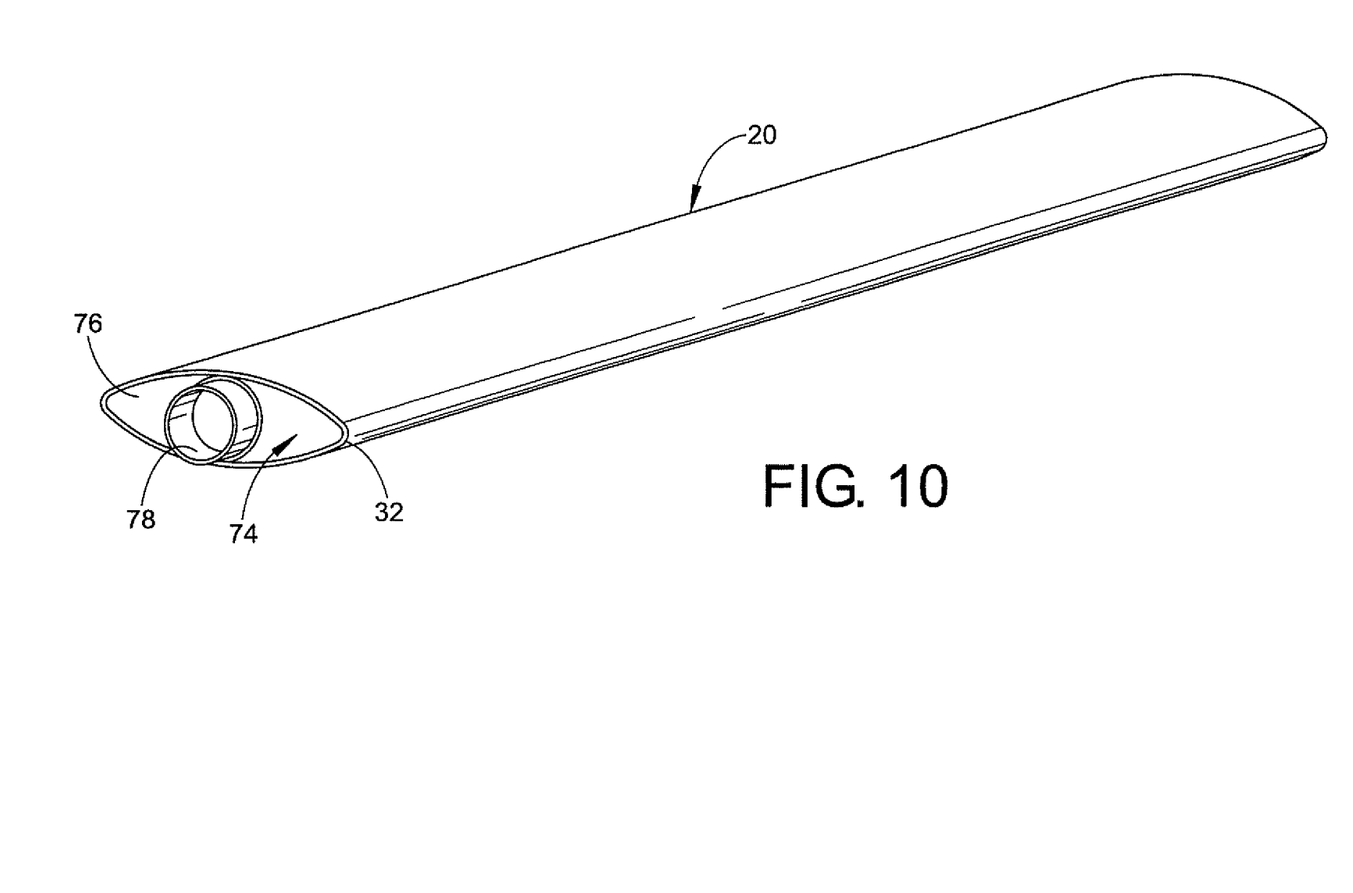
FIG. 10 is an enlarged perspective view of the sheath of FIG. 1 including a coupling section between a hot zone and a cold zone of the sheath.

With reference now to FIG. 9, this objective can be achieved by using a smaller diameter, standard round tube 70 for the cold zone portion of the heater. The round tube cold zone portion is affixed to the proximal end 32 of the sheath 20. The round tube 70 need only contain the lead wires and thus be of a sufficient size to handle the diameter of wires needed to carry the electrical load of the heater element sub-assembly 58. In one embodiment of the present disclosure, this round tube 70 can have a perimeter of only 1.57 inches (4 cm). This smaller tubing saves material and therefore cost. A further improvement when compared to a standard immersion heater is the use of a coupling 74 between the hot zone and the cold zone, as shown in FIG. 10. In one embodiment, the coupling can comprise an end wall 76 located at a proximal end 32 of the sheath 20 and a stub conduit 78 to which the tube 70 illustrated in FIG. 9 is connected. Because the dimensions of the cold zone can vary greatly from one application to another, a coupling, such as the one illustrated in FIG. 10, allows the manufacturer to produce a large number of common heater assemblies 10 with a fixed hot zone and then customize the length of the cold zone as needed.

Figure 11A:
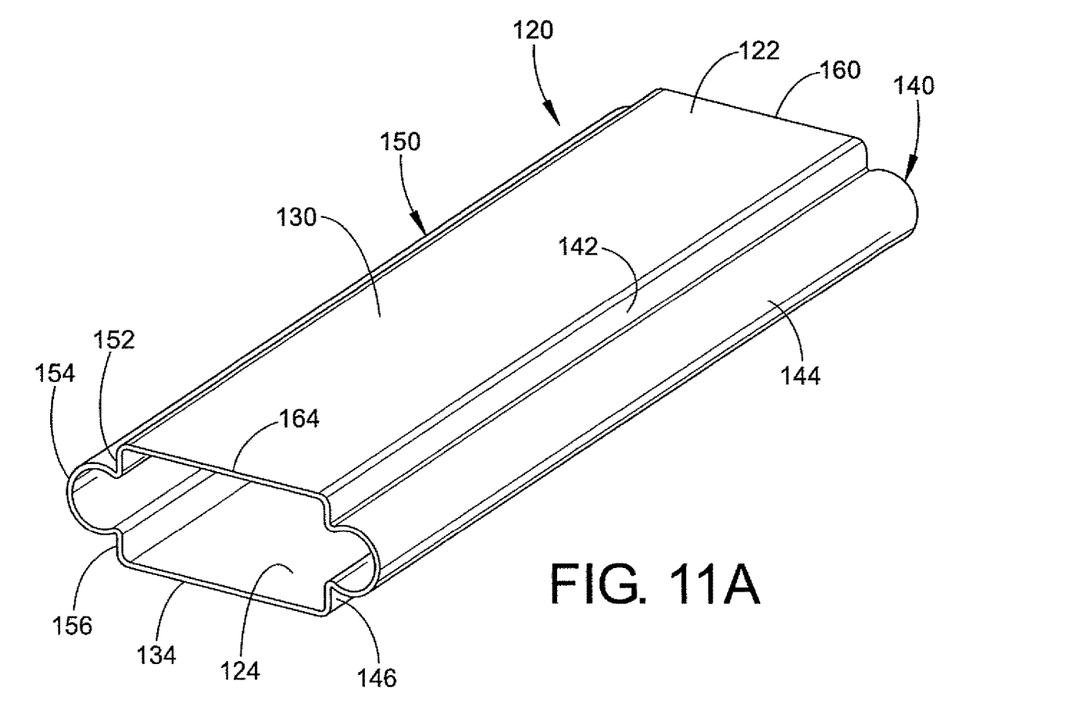
FIG. 11A is an isometric view of a sheath for a PTC heater assembly according to a third embodiment of the present disclosure.
Figure 11B:
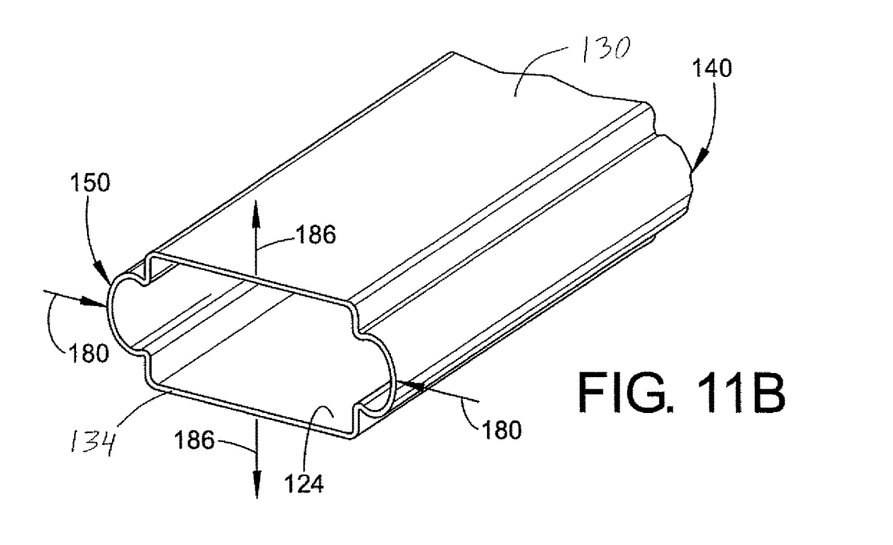
FIG. 11B is an isometric view of the sheath of FIG. 11A shown with the sheath being compressed along its major axis and expanded along its minor axis.

With reference now to FIG. 11A, another embodiment of an elastically deformable sheath 120 according to the present disclosure is there illustrated. In this embodiment, the sheath 120 includes a wall 122 which is of generally constant thickness along the length of the sheath. The wall encloses a hollow space 124. In this embodiment, the sheath has a more complex geometry than the elliptical sheath 20 illustrated in FIGS. 1-10. In this embodiment, the sheath includes a generally flat or planar top wall 130 and a generally flat or planar bottom wall 134. A first side wall 140 of the sheath 120 extends between and connects the top and bottom walls 130,134 and includes a first flat or planar portion 142, an outwardly extending rounded portion 144 and a second flat portion 146. The outwardly extending rounded portion 144 is located between the first and second flat portions 142,146 and is preferably symmetrically located between the top and bottom walls 130,134. It can be appreciated from a review of FIGS. 11A and 11B that the first and second flat portions 142 and 146 of the first side wall 140 extend generally normal to a plane of the top wall 130 and also to a plane of the bottom wall 134. A second side wall 150 of the sheath 120 is laterally spaced-apart from the first side wall 140 and extends between and connects the top and bottom walls 130,134. The second side wall 150 includes a first flat portion 152, an outwardly extending rounded portion 154 and a second flat portion 156. The outwardly extending rounded portion 154 is located between the first and second flat portions 152,156 and is preferably symmetrically located between the top and bottom walls 130,134. If so desired, a generally constant cross-section can be provided for the hollow space 124 from a distal end 160 thereof to a proximal end 164 thereof. The respective first and second outwardly extending portions 144, 154 of the first and second side walls can have a shape that is other than smoothly rounded such as a segmented curved shape or the like.

As in the previous embodiment, an interference fit can be provided between the sheath 120 and a heating element sub-assembly (not illustrated in this embodiment) arranged to be held within the hollow space 124. In this embodiment, the interference between the heating element sub-assembly and the sheath 120 is so designed that the sheath deforms elastically via the side walls 140 and 150 when the heat element sub-assembly is installed in the hollow space 124. More specifically, and with reference to FIG. 11B, when compressive elastically deforming forces, such as are illustrated by arrows 180, are exerted on the opposed side walls 140 and 150 of the sheath, the top wall 130 and bottom wall 134 will move away from each other as illustrated by arrows 186. In this way, the heat element sub-assembly, which is identical to the heat element sub-assembly 58 except for its peripheral shape which is rectangular and provided as shown for the heat transfer sub-assembly 300 of FIG. 12, can be installed in the hollow space 124. In the assembled condition, the heating element sub-assembly is thus clamped in a press fit between the sheath top and bottom walls 130 and 134. This can be done as the first and second side wall rounded portions 144 and 154 increase their radius somewhat. After the assembly force is released, the clamping sections formed by the pair of opposed side walls 140 and 150 attempt to return to their stress free condition. In this condition, they generate the desired holding or contact force on the heat element sub-assembly to hold or clamp the sub-assembly in place.

The sheath 120 thus provides a secure holding construction for the heating sub-assembly despite frequent temperature changes that the PTC heater assembly may be exposed to.

In one embodiment, the sheath 120 can have the following dimensions in the rectangular area of the sheath when in its uncompressed state. The rectangular area can be 2.00" (5.080 cm) in width and the distance between the two rectangular faces can be 0.75" (1.905 cm).

Figure 12:
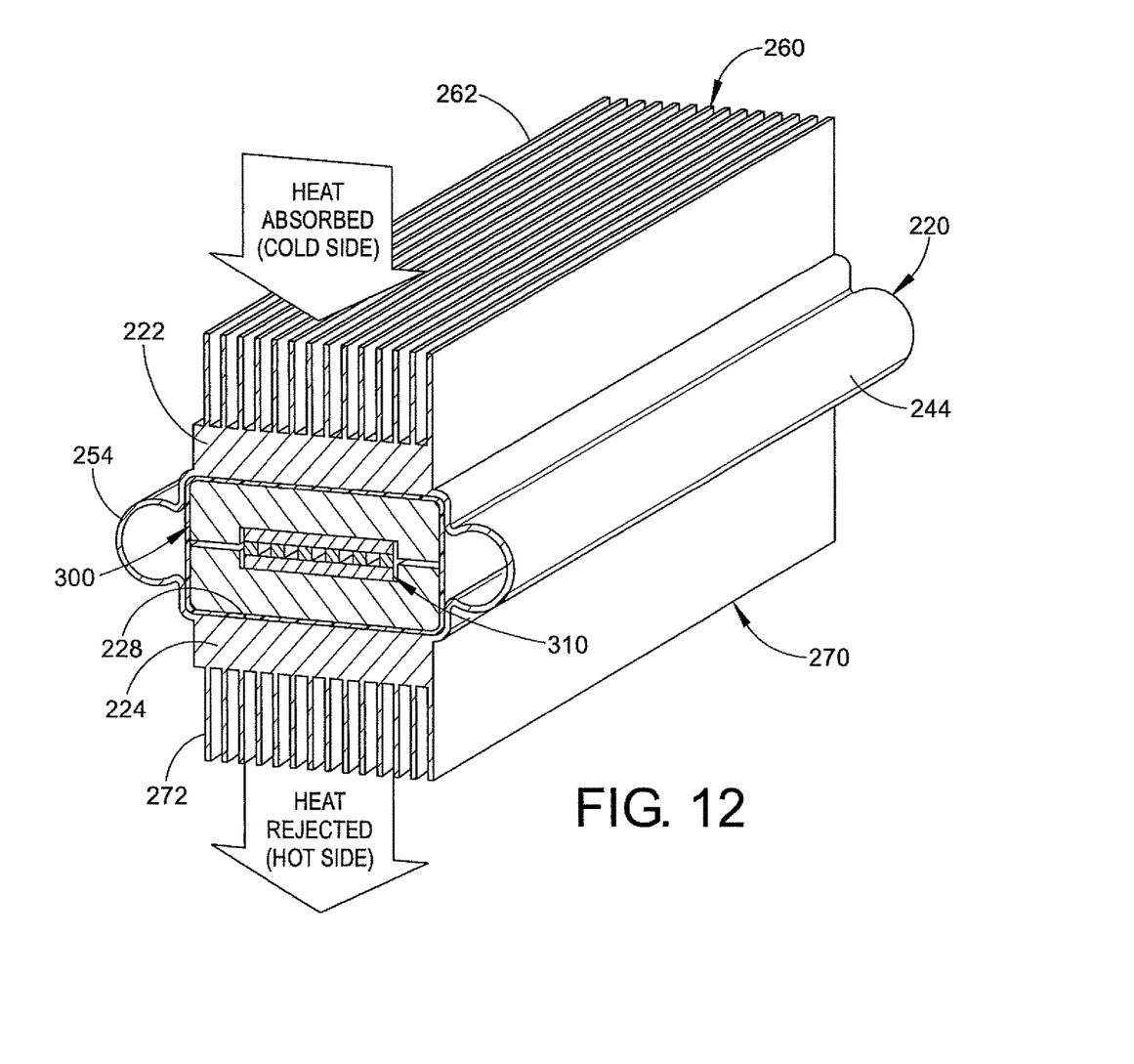
FIG. 12 is an isometric view of a sheath adapted for use with a heat transfer assembly employing at least one Peltier device according to a fourth embodiment of the present disclosure.

With reference now to FIG. 12, another embodiment of an elastically deformable sheath 220 is there illustrated. In this embodiment, the sheath includes top and bottom walls 222 and 224, as well as a pair of complexly shaped side walls 244 and 254 as in the embodiment of FIG. 11. Each of the side walls includes straight sections and curved sections as in the FIG. 11 embodiment. In this embodiment, the side walls 244 and 254 can be significantly thinner than are the top and bottom walls 222 and 224. In one embodiment, a first set of fins 260, including individual spaced fins 262, extend longitudinally along the axis of the sheath 220. The fins 262 are positioned on and extend away from the sheath top wall 222. Similarly, a second set of fins 270, including respective spaced fins 272, are positioned on and extend longitudinally along, and protrude away from, the bottom wall 224. Despite the thickness of the top and bottom walls, the sheath 220 is relatively flexible due to the resilience of the first and second side walls 244 and 254 thereof.

In one embodiment, the sets of fins 260 and 270 can be of one piece with the sheath 220 as in the embodiment illustrated in FIG. 12. However, it should be appreciated that the sets of fins 260 and 270 can be separately manufactured and can be secured to the sheath 220 such as by welding or another suitable attachment means if so desired.

As in the previous embodiments, an interference fit can be provided between the sheath 220 and a heat transfer sub-assembly 300 which is insertable into a hollow space 228 defined within the sheath. The sheath 220 deforms elastically via the side walls 244 and 254 when the heat transfer sub-assembly is installed in the hollow space 228. In the assembled condition, the heat transfer sub-assembly is thus clamped in a press fit between the sheath top and bottom walls 222 and 224. After the assembly force is released, the side walls 244 and 254 attempt to return to their stress free condition, thereby generating a desired holding or contact force on the heat transfer sub-assembly to hold the sub-assembly in place.

In this embodiment, the heat transfer sub-assembly 300 can be a set of Peltier semiconductor heat transfer devices 310 in which the Peltier effect is used to create a heat flux. In one orientation of current flow, the cold side of the sheath (via which heat is absorbed) can be the top wall 222 and the hot side (via which heat is rejected) can be the bottom wall 224. This orientation is shown by the arrows depicted in FIG. 12. In the opposite orientation of current flow, the hot side of the device will become the top wall 222 and the cold side will become the bottom wall 224. Thus, a Peltier device can be used either for heating or for cooling. In practice, the main application of Peltier devices is cooling.

The device illustrated in FIG. 12 can be designed to function as an inline solid state heater or chiller having no moving components. It can conceivably maintain temperature control at plus or minus 0.1° C. at temperatures ranging, for example, from 40° to 90° C. Such heat transfer devices can be used for semiconductor wet bench bath temperature control, or immersion lithography, electrochemical plating, or semiconductor copper deposition. In other embodiments, the device can have an operating range of, for example, from 5° C. to 40° C. or from 10° C. to 90° C., depending upon the wattage of the Peltier devices which are employed in the device.

Fans (not shown) could be located on one or both sides of the device illustrated in FIG. 12 if enhanced air movement is needed to increase the rate of heat transfer. On the cold side, for example on an inside of an enclosure, the fans could allow for convective heat transfer to remove heat from within the enclosure by hot air flowing past relatively cool inner fins. On the outside, the fans could function to dissipate the heat created by the Peltier device during the process of removing heat from within the enclosure by flowing relatively cool air past the relatively warm outer fins. It should be appreciated that the device of FIG. 12 could be integrated with the housing of an electrical enclosure or the like. In fact, such devices could be integrated with more than a single wall of the enclosure, if so desired to increase the rate of heat transfer.

Disclosed has been an immersible electrical device for heating liquids which comprises at least one positive temperature coefficient (PTC) thermistor, heating element or chip having generally parallel flat opposed contact surfaces. A pair of electrodes contact the heating element to provide electricity thereto. In one embodiment, the electrodes have generally parallel flat inward facing contact surfaces and generally curved outward facing contact surfaces. In another embodiment, the electrodes have generally flat inward and outward facing contact surfaces. The inward facing contact surfaces can be coated with a thermally and electrically conductive material. A dielectric film can be provided so as to fully or partially encircle the pair of conductors and the one or more PTC chips to form a heat element sub-assembly. The entire sub-assembly is then placed within the sheath to form a PTC heater assembly.

In one embodiment, the sheath can be elliptical in cross-section. In another embodiment, the sheath can have a complex cross-section, including planar surfaces and rounded surfaces. The sheath can be elastically deformed so as to allow the heating element sub-assembly to be installed in the sheath. Once the deformation force is removed from the sheath, it will elastically attempt to return to its unstressed condition, thereby clamping the heat element sub-assembly in place within the sheath.

Also disclosed has been a heat transfer device which comprises a resilient sheath capable of holding a heat transfer sub-assembly. Electricity is provided to the sub-assembly to activate the heat transfer elements located in the sub-assembly and either heat or cool and adjacent fluid, such as a liquid or, for example, air within an electrical enclosure or the like. In one embodiment, the heat transfer elements can be Peltier devices which are efficient in cooling an enclosure even without the use of any moving parts, such as may be needed in electrical enclosures that must remain sealed.

The disclosure has been described with reference to several embodiments. Obviously, modifications and alterations will occur to others upon the reading and understanding of this specification. It is intended to include all such modifications and alterations insofar as they come within the scope of the appended claims or the equivalents thereof.

The invention claimed is:

1. A heat transfer assembly comprising:
a metallic tubular sheath including a wall that defines an internal hollow space; and
a heat transfer sub-assembly located in said internal hollow space, said heat transfer sub-assembly comprising at least one semiconductor heat transfer device located between first and second electrodes, said at least one semiconductor heat transfer device comprising at least one of: (i) a PTC heating device; (ii) a Peltier heat transfer device;
wherein said heat transfer sub-assembly is retained within said internal hollow space with an interference fit between said wall and said heat transfer sub-assembly;
said wall of said tubular sheath defining said tubular sheath and said internal hollow space to comprise an elliptical cross section defined by a major axis and a minor axis;
respective outer surfaces of the first and second electrodes are shaped to conform to said elliptical wall of said tubular sheath such that said heat transfer sub-assembly comprises a partially elliptical outer surface that is in intimate contact with an inner surface of said wall such that a majority of a perimeter of said wall of said sheath is abutted with said heat transfer sub-assembly;
said first and second electrodes comprises respective inner faces that are arranged in opposed facing relation and define a slot there between in which said at least one semiconductor heat transfer device is located, said slot oriented parallel to the major axis of said tubular sheath;
said elliptical tubular sheath resiliently deformed relative to its free state by the presence of said heat transfer sub-assembly in said internal hollow space such that said elliptical tubular sheath exerts clamping forces on said heat transfer sub-assembly that clamp said heat transfer sub-assembly in said internal hollow space;
said heat transfer assembly further comprising a layer of dielectric film wrapped around said heat transfer sub-assembly that electrically insulates said heat transfer sub-assembly from said wall of said tubular sheath and that allows thermal transfer between said heat transfer sub-assembly and said wall of said tubular sheath.

2. The heat transfer assembly as set forth in claim 1, wherein a plurality of said semiconductor heat transfer devices are located in said slot and are axially spaced apart from each other along a longitudinal axis of the sheath.

3. The heat transfer assembly as set forth in claim 1, wherein application of opposed inwardly directed deformation forces exerted on said sheath along said major axis increases a height of said internal hollow space along said minor axis and eliminates said interference fit between said wall of said sheath and said heat transfer sub-assembly.

4. The heat transfer assembly as set forth in claim 1, wherein application of opposed inwardly directed deformation forces coincident with said major axis on said sheath shortens said major axis and lengthens said minor axis to eliminate said interference fit between said wall of said sheath and said heat transfer sub-assembly.

5. The heat transfer assembly as set forth in claim 1, further comprising fins connected to said sheath for increased heat transfer between said sheath and an environment surrounding said sheath.

6. A heat transfer assembly comprising:
a tubular sheath including a wall that defines an internal hollow space; and
a heat transfer sub-assembly located in said internal hollow space, said heat transfer sub-assembly comprising at least one semiconductor heat transfer device located between first and second electrodes;
wherein:
said heat transfer sub-assembly is retained within said internal hollow space with an interference fit between said wall and said heat transfer sub-assembly;
said heat transfer sub-assembly is electrically insulated from said tubular sheath by a layer of electrically insulative and thermally conductive material located between said heat transfer sub-assembly and said wall of said tubular sheath;
said wall of said tubular sheath is elliptical in cross-section and said internal hollow space has an elliptical cross-section defined by a major axis and a minor axis; and
respective outer surfaces of the first and second electrodes are shaped to conform to said wall such that said heat transfer sub-assembly is in intimate contact with said wall;
said heat transfer assembly further comprising first and second filler rods located in the internal hollow space respectively adjacent opposite first and second lateral sides of the heat transfer sub-assembly, said first filler rod located between said heat transfer sub-assembly and a first vertex of the major axis and said second filler rod located between said heat transfer sub-assembly and a second vertex of the major axis.

7. A heat transfer assembly comprising:
a tubular sheath including a wall that defines an internal hollow space; and
a heat transfer sub-assembly located in said internal hollow space, said heat transfer sub-assembly comprising at least one semiconductor heat transfer device located between first and second electrodes;
wherein:
said heat transfer sub-assembly is retained within said internal hollow space with an interference fit between said wall and said heat transfer sub-assembly;
said heat transfer sub-assembly is electrically insulated from said tubular sheath by a layer of electrically insulative and thermally conductive material located between said heat transfer sub-assembly and said wall of said tubular sheath;
said wall of said tubular sheath is elliptical in cross-section and said internal hollow space has an elliptical cross-section defined by a major axis and a minor axis; and,
respective outer surfaces of the first and second electrodes are shaped to conform to said wall such that said heat transfer sub-assembly is in intimate contact with said wall;
said heat transfer assembly further comprising filler material located in the internal hollow space respectively adjacent opposite first and second lateral sides of the heat transfer sub-assembly, said filler material located between said heat transfer sub-assembly and a first vertex of the major axis and located between said heat transfer sub-assembly and a second vertex of the major axis.

* * * * *